Figure 1:
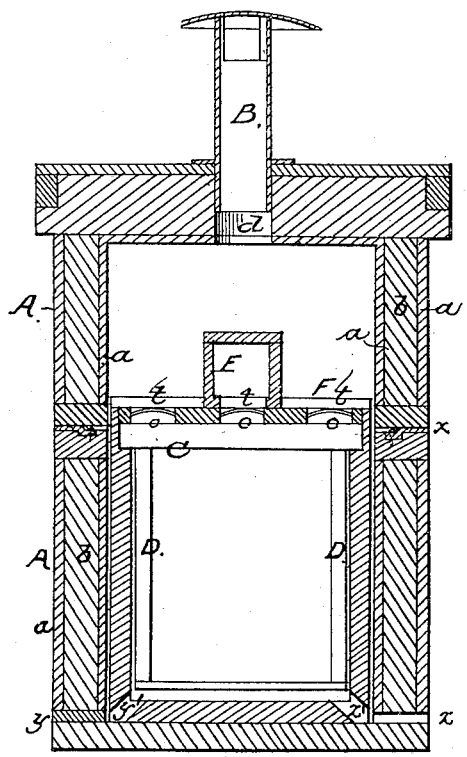
Figure 2:
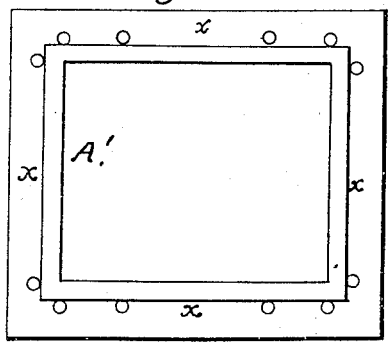

R. JONES.
Bee Hive.

No. 70,338.

Patented Oct. 29, 1867.

WITNESSES:
A. N. Morr
V. D. Stockbridge

INVENTOR:
Robert Jones
per Alexander & Mason
Attorneys

N. PETERS, PHOTO-LITHOGRAPHER, WASHINGTON, D C.

United States Patent Office.

ROBERT JONES, OF CEDARSVILLE, ILLINOIS.

Letters Patent No. 70,338, dated October 29, 1867.

IMPROVEMENT IN BEE-HIVES.

The Schedule referred to in these Letters Patent and making part of the same.

TO ALL WHOM IT MAY CONCERN:

Be it known that I, ROBERT JONES, of Cedarsville, in the county of Stephenson, and in the State of Illinois, have invented certain new and useful Improvements in "Bee-Hives;" and do hereby declare that the following is a full, clear, and exact description thereof, reference being had to the accompanying drawings, and to the letters of reference marked thereon, making a part of this specification.

My invention relates to an improvement upon bee-hives whereby the honey-boxes are more easily handled and the honey-frames more readily taken out and new ones inserted; also in giving a perfect ventilation for the bees in all seasons.

This hive-frame is composed of two unconnected sections, A A'. The lower section A' is intended for the honey-frames, and is the main body of the hive. The frame A A' is composed of lath or boards $b$ plastered on the exterior and interior, which plastering $a$ is composed of water, lime, and new milk, for the purpose of making the hive perfectly air-tight, water-proof, and much lighter than the ordinary mortar or plastering. D represents a wooden box which fits snugly within the section A', and upon which the honey-frames C are hung. F represents the honey-board, which has openings, $o\ o$, and which openings may be covered either with plain or perforated caps, $t\ t$, as is desired. Upon this honey-board are placed the honey-boxes E, as shown. The top edge of section A' is covered with flannel, India rubber, or other substance, $x$, for keeping the hive air-tight. Through the roof A' is a hole, $d$, which is shielded and covered by the pipe B for ventilating the hive. At the bottom of section A', at its front, is an opening for the ingress and egress of the bees, $z$, while there is also an opening, $z'$, in the box D, as seen. At the rear of the hive, at its bottom, there is another opening, $y$, and a corresponding opening, $y'$, in the chamber D, for ventilating the hive by means of the honey-board and pipe B. The pipe B is intended for winter ventilation only, and can be taken off and the opening closed in hot weather. The ordinary hives often cause the smothering of the bees, as there is but one opening, and it is many times clogged up by the drifting snow.

Having thus fully described my invention, what I claim as new, and desire to secure by Letters Patent, is—

A bee-hive with two horizontal sections, A A', having rubber or cloth $x$ between them, and with the interior and exterior covered with the plastering specified, box D, honey-board F, ventilating hole $y$, and pipe B, all constructed, arranged, and used for the purposes set forth.

In testimony that I claim the foregoing I have hereunto set my hand this 20th day of February, 1867.

ROBERT JONES.

Witnesses:
  J. RICHART,
  HENRY J. RICHART,